United States Patent

Shouman

[19]

[11] Patent Number: 5,771,678
[45] Date of Patent: Jun. 30, 1998

[54] WATER-INJECTED STOICHIOMETRIC-COMBUSTION GAS TURBINE ENGINE

[76] Inventor: Ahmad R. Shouman, 1006 Bloomdale Dr., Las Cruces, N. Mex. 88005

[21] Appl. No.: 598,575

[22] Filed: Feb. 12, 1996

[51] Int. Cl.$^6$ .................................................. F02C 7/00
[52] U.S. Cl. .................... 60/39.55; 60/39.15; 60/39.182; 60/39.3
[58] Field of Search ............................. 60/39.15, 39.2, 60/39.182, 39.3, 39.55, 39.58

[56] References Cited

U.S. PATENT DOCUMENTS

| | | | |
|---|---|---|---|
| 2,547,093 | 4/1951 | Ray ........................................ | 60/39.15 |
| 2,554,593 | 5/1951 | Sedille ................................... | 60/39.15 |
| 4,387,562 | 6/1983 | Takao et al. ........................... | 60/39.15 |
| 4,680,927 | 7/1987 | Cheng .................................... | 60/39.55 |
| 5,303,544 | 4/1994 | Kobayashi et al. ................... | 60/39.182 |
| 5,357,741 | 10/1994 | Talabisco et al. ...................... | 60/39.3 |

*Primary Examiner*—Charles G Freay
*Attorney, Agent, or Firm*—Calvin B. Ward

[57] ABSTRACT

A gas turbine engine having an air compressor and a combustion chamber connected to the air compressor for burning fuel with air from the air compressor. The combustion chamber also has water and/or steam as input. The water and/or steam is combined with the gases generated by the burning of the fuel to generate a gaseous output that drives first and second turbines. A heat recovery system recovers heat and water from the gaseous output after the gaseous output has passed through the turbines. The water is used as the water source for the combustion chamber and for cooling the turbines. In the preferred embodiment of the present invention, the heat recovery system utilizes a supercritical heat exchanger. Some of the recovered heat is preferably utilized to drive a third expander. In systems designed to accommodate a variable load, the preferred embodiment of an engine according to the present invention includes a device for regulating the fraction of the gaseous output from the combustion system that passes through the second turbine. In the preferred embodiment of the present invention, the device is a valve or variable geometry inlet nozzle blades in the second turbine. The valve preferably operates by regulating the back-pressure to which the second turbine is subjected. Alternatively, the variable load may be accommodated by utilizing separate combustion chambers for the two turbines and regulating the rate of fuel consumption in one or both of the combustion chambers. A conventional gas turbine engine may be converted to a turbine according to the present invention by adding a second turbine of the same capacity as the existing turbine and a heat recovery system and by modifying the combustion chamber to accept a water input.

8 Claims, 6 Drawing Sheets

WATER-INJECTED STOICHIOMETRIC-COMBUSTION GAS TURBINE ENGINE

FIELD OF THE INVENTION

The present invention relates to gas turbine engines, and more particularly, to gas turbine engines utilizing steam and/or water injection.

BACKGROUND OF THE INVENTION

In a conventional gas turbine engine, a compressor introduces air into a combustion chamber in which the air is mixed with the burning fuel to produce gases that drive a turbine. The turbine drives a load consisting of the compressor and an external load. The efficiency of such a turbine design improves with increasing operating temperatures; however, there is a limit to the operating temperature dictated by the temperature at which the turbine blades and related systems fail.

To maintain the temperature below this maximum temperature, the fuel to air ratio in the combustion chamber is maintained below the point at which stoichiometric combustion of the fuel is achieved. The additional air maintains the gases below the maximum operating temperature. Unfortunately, the energy needed to compress this additional air reduces the overall efficiency of the engine.

These observations have led to gas turbine designs in which steam and/or water is injected into the combustion system. For example, Dah Yu Cheng (U.S. Pat. Nos. 3,978,661, 4,128,994 and 4,297,841) recognized that steam addition to the Brayton cycle can significantly increase the power and efficiency of the engine provided heat is recovered from the exhaust gases. The power generated by the drive turbine at any given temperature is determined by the specific heat of the gases expanding through the turbine. Since steam has a much higher specific heat than air, the use of steam as the coolant significantly improves the power that can be generated by the turbine.

Unfortunately, the amount of heat that leaves the system in the exhaust gases also increases when steam is used. The exhaust gases generated in a steam injected engine leave at a higher temperature and have a higher specific heat. Hence, in the absence of some form of heat recovery system, the overall efficiency of the engine decreases. Cheng used a heat recovery boiler to recover the heat from the exhaust gases of the turbine to produce steam. Because of the pinch point limitation on the operating pressure of the heat recovery boiler, and hence the operating pressure ratio of the turbine, the maximum achievable efficiency was not achieved in this system. Patton and Shouman (U.S. Pat. No. 4,841,721) solved the pinch point problem by operating the heat recovery system in the supercritical regime. Urbach et al. in U.S. Pat. No. 4,509,324 described an engine system having a different heat recovery system. In this patent the exhaust gases from the compressor turbine are mixed with the high pressure gases from the combustor before entering the power turbine. As a result, there is a significant reduction in the available power.

One of the major obstacles in implementing the Cheng, Patton-Shouman, and Urbach et al. systems is the cost of developing new engine components and new engines. When the scheme described by Cheng is applied to an existing gas turbine plant, the operating range of the plant is limited by the surge characteristics of the compressor. As a result, the amount of steam that could be injected is limited to about 10% to 15% of the air mass flow into the engine combustor. This level is significantly below the optimum steam injection level. To overcome this limitation, one would need to replace the drive turbine with a turbine capable of expanding a much larger mass flow. The cost of such a redesign and retro-fit is prohibitive. Hence, the improvements obtainable by steam injection have not been realized in existing power plants.

Broadly, it is the object of the present invention to provide an improved gas turbine engine.

It is a further object of the present invention to provide a retro-fit to existing gas turbine engines that allows the benefits of steam injection to be obtained without requiring that new turbines be designed and constructed.

These and other objects of the present invention will become apparent to those skilled in the art from the following detailed description of the invention and the accompanying drawings.

SUMMARY OF THE INVENTION

The present invention is a gas turbine engine having an air compressor and a combustion chamber connected to the air compressor for burning fuel with air from the air compressor. The combustion chamber also has water and/or steam as input. The water and/or steam is combined with the gases generated by the burning of the fuel to generate a gaseous output that drives first and second turbines. A heat recovery system recovers heat and water from the gaseous output after the gaseous output has passed through the turbines. The water is used as the water source for the combustion chamber and for cooling the turbines. In the preferred embodiment of the present invention, the heat recovery system utilizes a supercritical heat exchanger. Some of the recovered heat is preferably utilized to drive a third expander. In systems designed to accommodate a variable load, the preferred embodiment of an engine according to the present invention includes a device for regulating the fraction of the gaseous output from the combustion system that passes through the second turbine. In the preferred embodiment of the present invention, the device is a valve or variable geometry inlet nozzle blades in the second turbine. The valve preferably operates by regulating the back-pressure to which the second turbine is subjected. Alternatively, the variable load may be accommodated by utilizing separate combustion chambers for the two turbines and regulating the rate of fuel consumption in one or both of the combustion chambers. A conventional gas turbine engine may be converted to a turbine according to the present invention by adding a second turbine of the same capacity as the existing turbine and a heat recovery system and by modifying the combustion chamber to accept a water input.

DETAILED DESCRIPTION OF THE INVENTION

Figure 1:
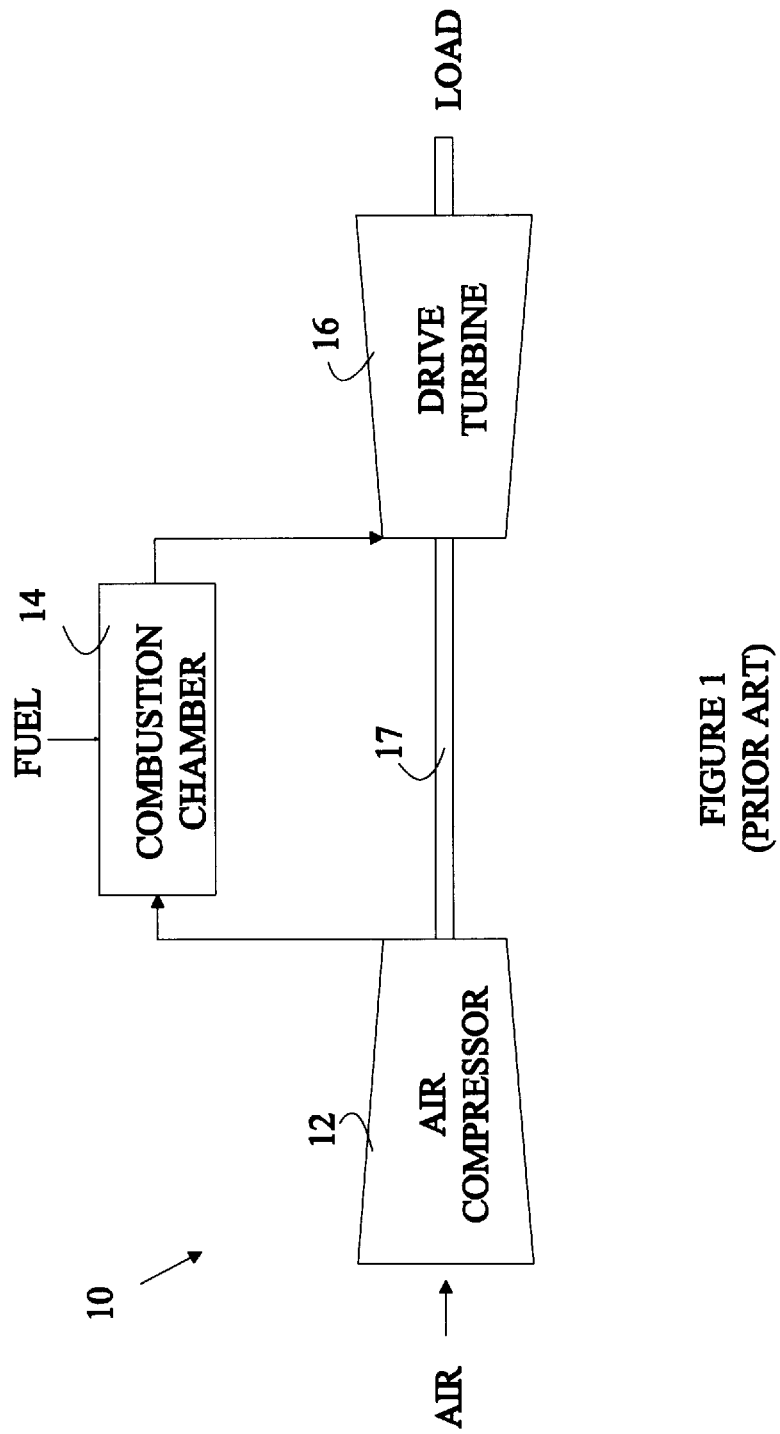
FIG. 1 is a block diagram of a conventional gas turbine engine.

The present invention may be more easily understood with reference to the modifications needed to a conventional gas turbine engine to provide steam injection for increasing both the power and efficiency of the engine. Refer now to FIG. 1 which is a block diagram of a conventional gas turbine engine 10. Combustion chamber 14 is supplied with air by compressor 12. The fuel burned in combustion chamber 14 generates additional gases as well as heating the compressed air. The expanding gases drive a turbine 16 which is connected to the load. Drive turbine 16 also drives compressor 12 via shaft 17.

As noted above, the maximum operating temperature of turbine 16 determines the operating temperature of the system. The power generated by turbine 16 is determined by the specific heat of the gases expanding therethrough. Hence, to increase the power generated by turbine 16, a gas mixture having a higher specific heat must be utilized. If water is injected into combustion chamber 14 in place of a portion of the air, the exhaust gases will have a significantly higher specific heat, since steam has about twice the specific heat of air. The theoretical limit on the amount of air that can be replaced by steam is determined by the amount of oxygen needed to burn the fuel. Unfortunately, this limit cannot be reached with existing turbine engines without replacing the drive turbines with turbines capable of expanding a much larger mass flow. The high cost of redesigning the turbines, setting up manufacturing facilities for the new turbine designs and retrofitting existing engines has prevented such retrofitting.

The present invention is based on the observation that the mass flow capability of an existing turbine engine may be increased by operating a second turbine in parallel with the first turbine. The second turbine absorbs the increased mass flow, thereby allowing higher levels of steam to be injected into the combustion system. If the second turbine is identical to the first turbine, then the expense of designing and manufacturing a new drive turbine design can be avoided. In the preferred embodiment of the present invention, the second turbine is modified to allow its inlet nozzle blades to be adjustable so that the turbine will operate at the maximum efficiency throughout the entire operating range.

Figure 2:
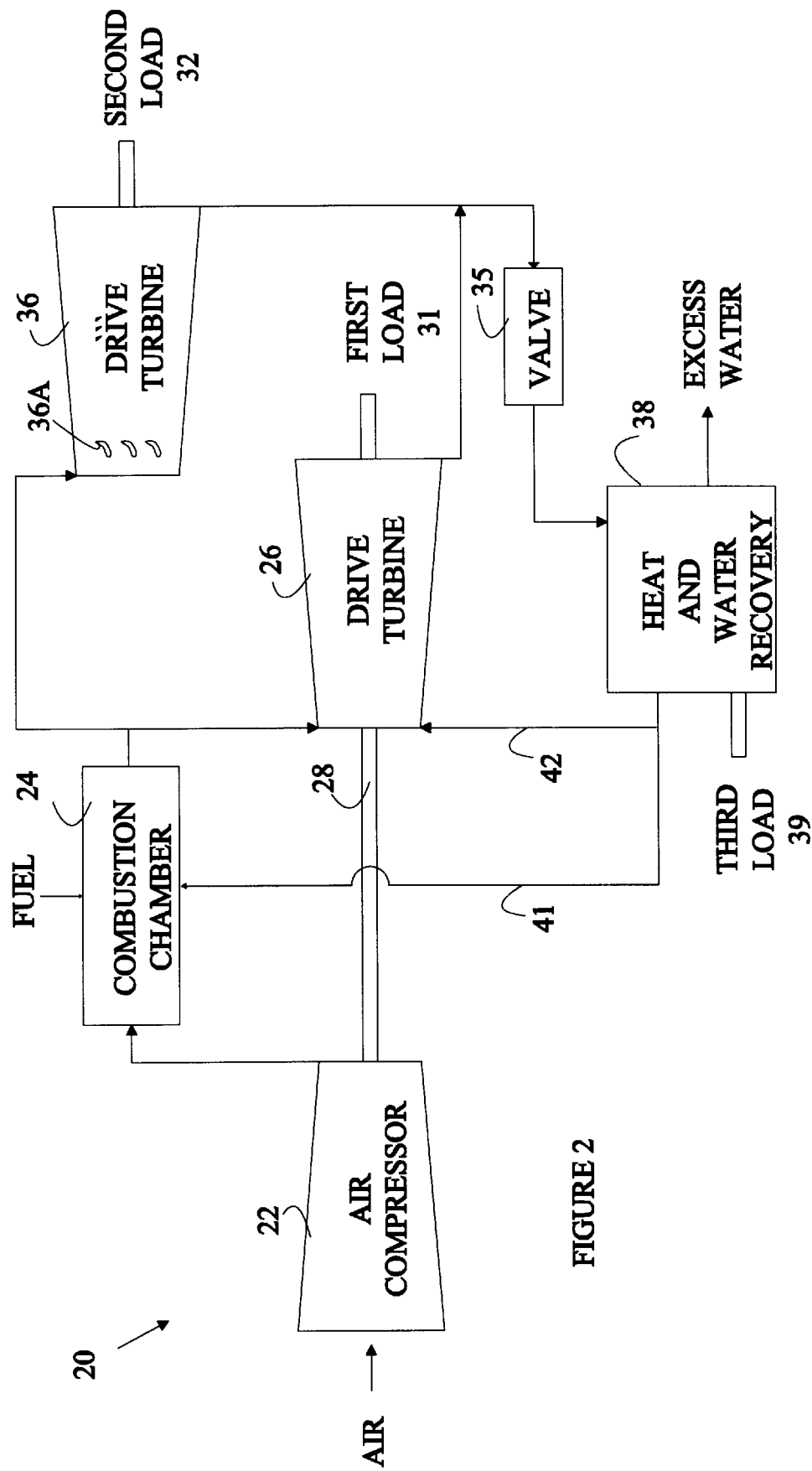
FIG. 2 is a block diagram of a steam injected turbine according to the present invention.

Refer now to FIG. 2 which is a block diagram of a steam injected turbine 20 according to the present invention that is constructed by modifying an existing turbine engine. The existing engine consisted of air compressor 22 and drive turbine 26. The combustion chamber 24 has been modified to accept steam and/or water injection. Air compressor 22 is driven by turbine 26 via shaft 28. Drive turbine 26 also drives a first load 31. Load 31 may be somewhat larger than the original load driven by turbine 26.

Most of the additional mass flow generated by the steam injection is absorbed by a second drive turbine 36 which drives a second load 32. In the preferred embodiment of the present invention, turbine 36 is identical to turbine 26 with the possible exception of modifications to allow variable mass flow therethrough. If the second load varies, then it is advantageous to be able to vary the power output of turbine 36 by varying the amount of fuel burned in combustion chamber 24. Such variable mass flow modifications for existing turbine engines are known to the art, and hence, will not be discussed in detail here. For the purposes of the present discussion, it is sufficient to note that the mass flow through turbine 36 may be varied via valve 35 which regulates the back pressure to which the exhaust gasses are subjected. Alternatively, the mass flow through turbine 36 may be controlled by including variable area inlet nozzles 36A in turbine 36. It will be apparent to those skilled in the art that a valve could also be utilized at the input to turbine 36; however, such a design requires a valve that can withstand much higher temperatures.

The gases leaving turbines 26 and 36 are routed through a heat and water recovery system 38 that will be discussed in more detail below. For the purposes of the present discussion, it is sufficient to note that recovery system 38 collects water from the exhaust gases for re-injection into combustion chamber 24 and recovers sufficient heat to drive a third load 39. Since the combustion of hydrocarbons generates water, the system generates more water than actually needed for the steam injection cycle. Hence, recovery system 38 discharges the excess water as shown in the drawing. The injection water stream is split into two streams shown at 41 and 42. Stream 41 is injected into combustion chamber 24. Stream 42 is used to cool the stators and high pressure stages of turbines 26 and 36. After cooling these components, these streams are mixed with mainstream flow through the turbines. The connection between recovery system 38 and turbine 36 has been omitted from FIG. 2 to simplify the drawing.

It should be noted that gas turbine power plants may be viewed as being of two general configurations. The configuration shown in FIGS. 1 and 2 utilizes a single shaft configuration in which the load, turbine system and compressor system are connected by one solid shaft. This restricts the load rotational speed to that of the compressor system. In the second configuration, referred to as the dual or free shaft configuration, two turbines are employed. The compressor system is connected by a solid shaft to the compressor drive turbine system. A second turbine system downstream of the first is solidly connected to the load. The two turbines are connected hydrodynamically through the gas duct work. This allows the rotational speed of the load to be independent of the rotational speed of the compressor. The present invention may also be utilized in this second configuration.

Figure 3:
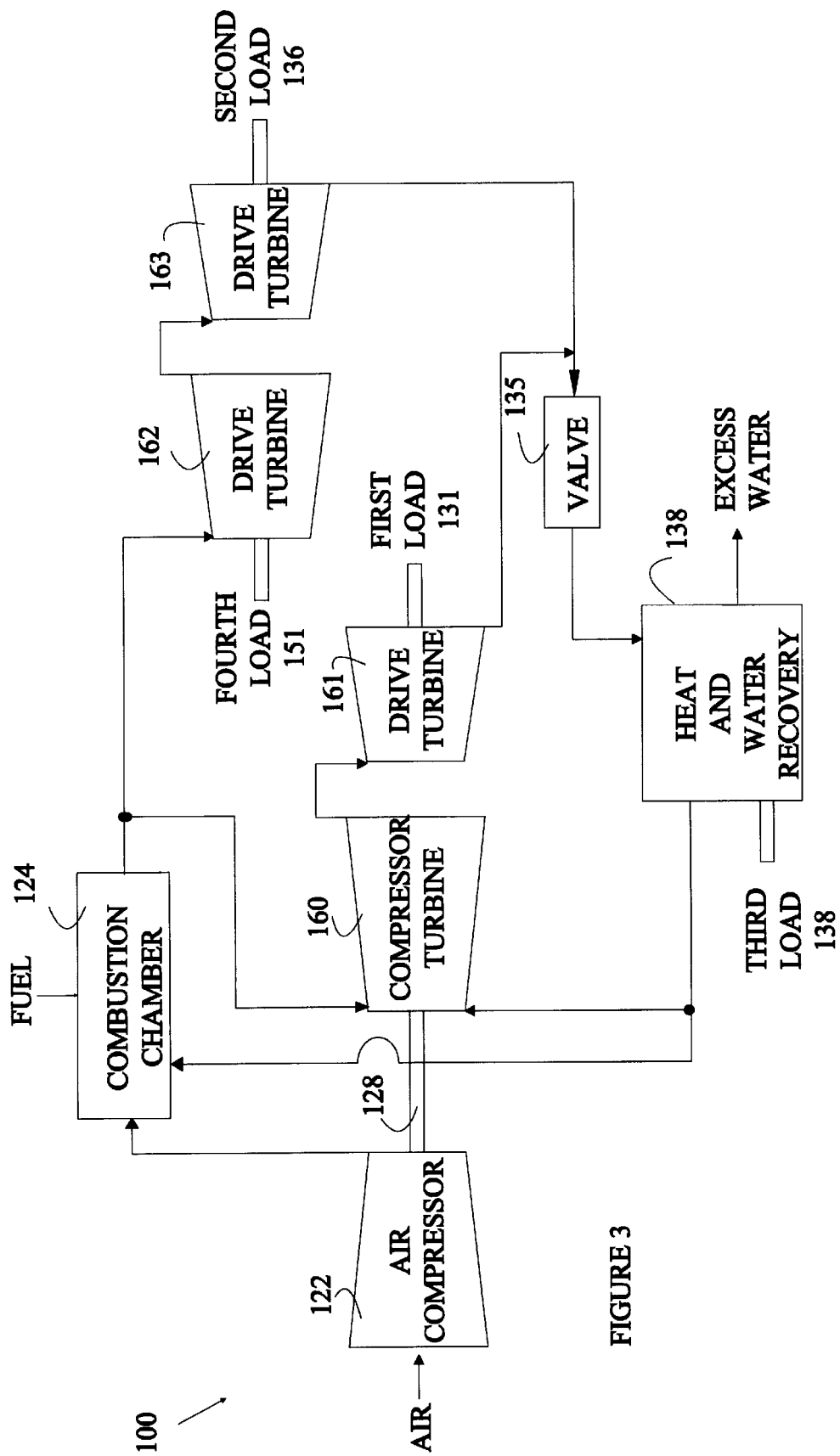
FIG. 3 is a block diagram of a gas turbine engine of the free shaft configuration that has been retro-fit with additional turbines and steam injection according to the present invention.

Refer now to FIG. 3 which is a block diagram of a gas turbine engine 100 of the free shaft configuration that has been retro-fit with additional turbines and steam injection according to the present invention. Engine 100 may be viewed as engine 20 with the drive turbines each replaced by a pair of turbines coupled by a gas duct that feeds the exhaust from the first turbine to the intake of the second turbine. The combustion chamber receives air from compressor 122 and drives two sets of turbines. The first set shown at 160 and 161 corresponds to the replacement of drive turbine 26. The first compressor of this set drives air compressor 122 via shaft 128. The second turbine 161 drives a first load 131. The second set of turbines shown at 162 and 163 corresponds to drive turbine 36 shown in FIG. 2. Turbine 162 drives load 151 and turbine 163 drives load 136. Turbines 162 and 163 are driven by the mass flow from combustion chamber 124 that cannot be accommodated in turbines 160 and 161. The amount of the output that passes through turbines 162 and 163 is determined by valve 135 or the adjustable nozzles of the turbines.

A heat recovery system 138 collects the exhausts from the various turbines and recovers sufficient energy to drive load 138. The water recovered by heat recovery system 138 is again split into two streams. One stream is injected into combustion chamber 124 and the other is used to cool the stator and high pressure stages of the various turbines in a manner analogous to that described above with reference to FIG. 2.

In the preferred embodiment of the present invention, turbines 160 and 162 are identical to each other except for a retro-fit of turbine 162 that allows it to operate at variable mass flow. Similarly, turbines 161 and 163 are identical to each other except for the variable mass flow modification. This enables off-the-shelf components to be used in the retro-fit. A retrofitted turbine can also be used in place of turbine 160 and/or 162 to further increase the range of mass flow variability.

In principle, turbines 162 and 163 could be replaced by a single larger turbine driving a single load and still achieve the advantages of the free shaft configuration. However, unless the size of this larger turbine happens to correspond to the turbine of another engine that is available off-the-shelf, the cost of this approach will, in general, be prohibitive.

Figure 4:
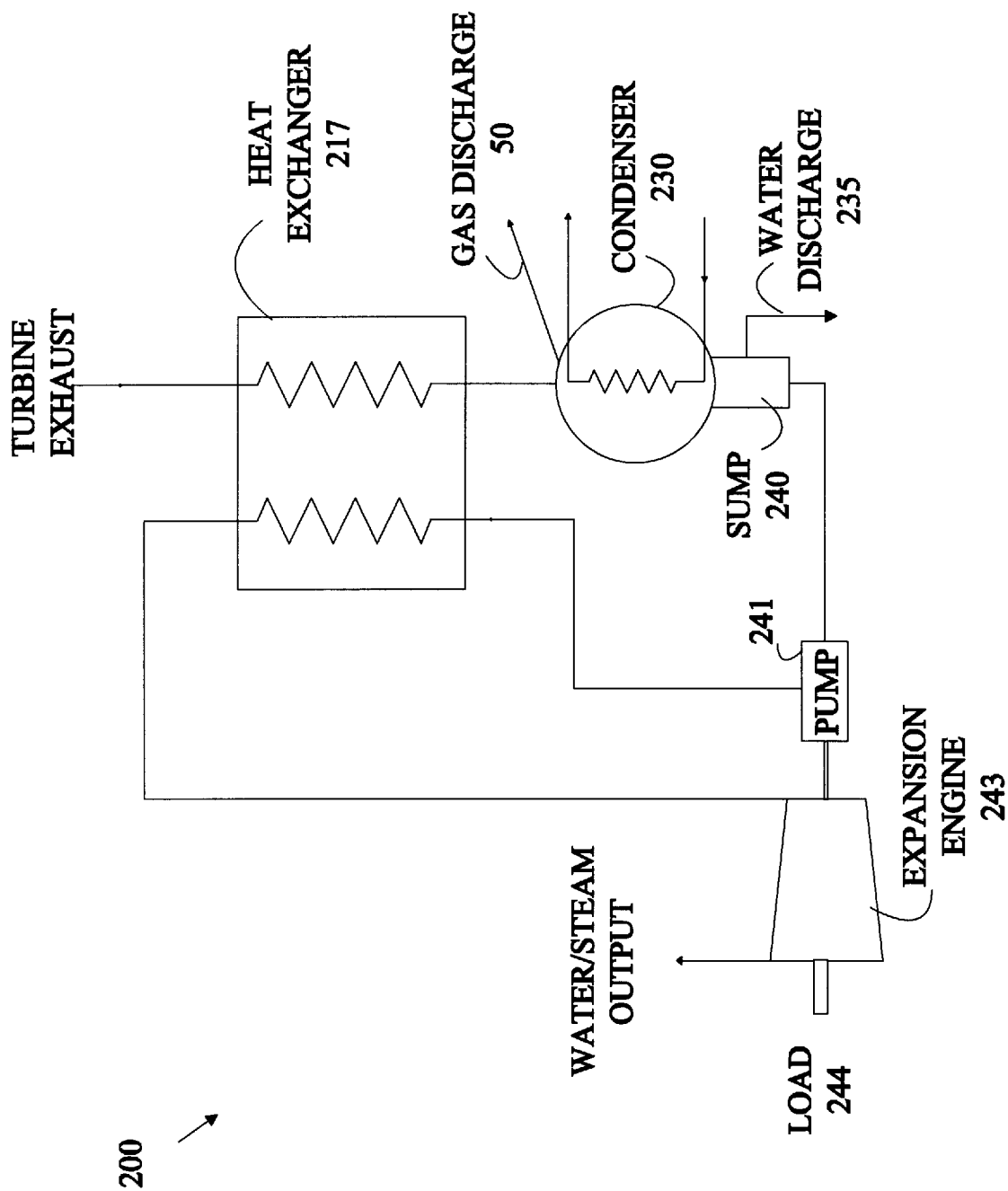
FIG. 4 is a block diagram of a heat and water recovery system 200 according to the present invention.

Having discussed the basic engine configurations, the manner in which the heat and water recovery systems shown at 38 and 138 operate will be discussed in more detail. As noted above, without some form of heat recovery, the efficiency of the steam injected engine will be less than that of the non-steam injected engine. Refer now to FIG. 4 which is a block diagram of a heat and water recovery system 200 according to the present invention. The gases leaving both turbine systems are combined and pass through the supercritical heat exchanger 217. The gases leaving the heat exchanger 217 enter condenser 230 which can operate either at atmospheric or sub-atmospheric pressure. The noncondensable gases are discharged through line 250 to the atmosphere. If the condenser is operated at sub-atmospheric pressure, a compressor must be used to discharge the gases through line 250. The condenser is equipped with a sump 240 of the desired capacity. A float valve maintains a constant water level in the sump. Any excess water is drained through line 235 by gravity when the condenser is operating at atmospheric pressure or by a pump when it is operating at sub-atmospheric pressure.

Condensed water is pumped by pump 241 to a pressure above the critical pressure of water through heat exchanger 217. The heated supercritical water leaves the heat exchanger 217 and expands through the expansion engine 243 which is capable of expanding liquid and/or vapor. The expansion engine 243 drives the pump 241 as well as a load 244. The mixture of liquid and vapor leaving the expansion engine 243 is divided into the two streams discussed above.

Figure 5:
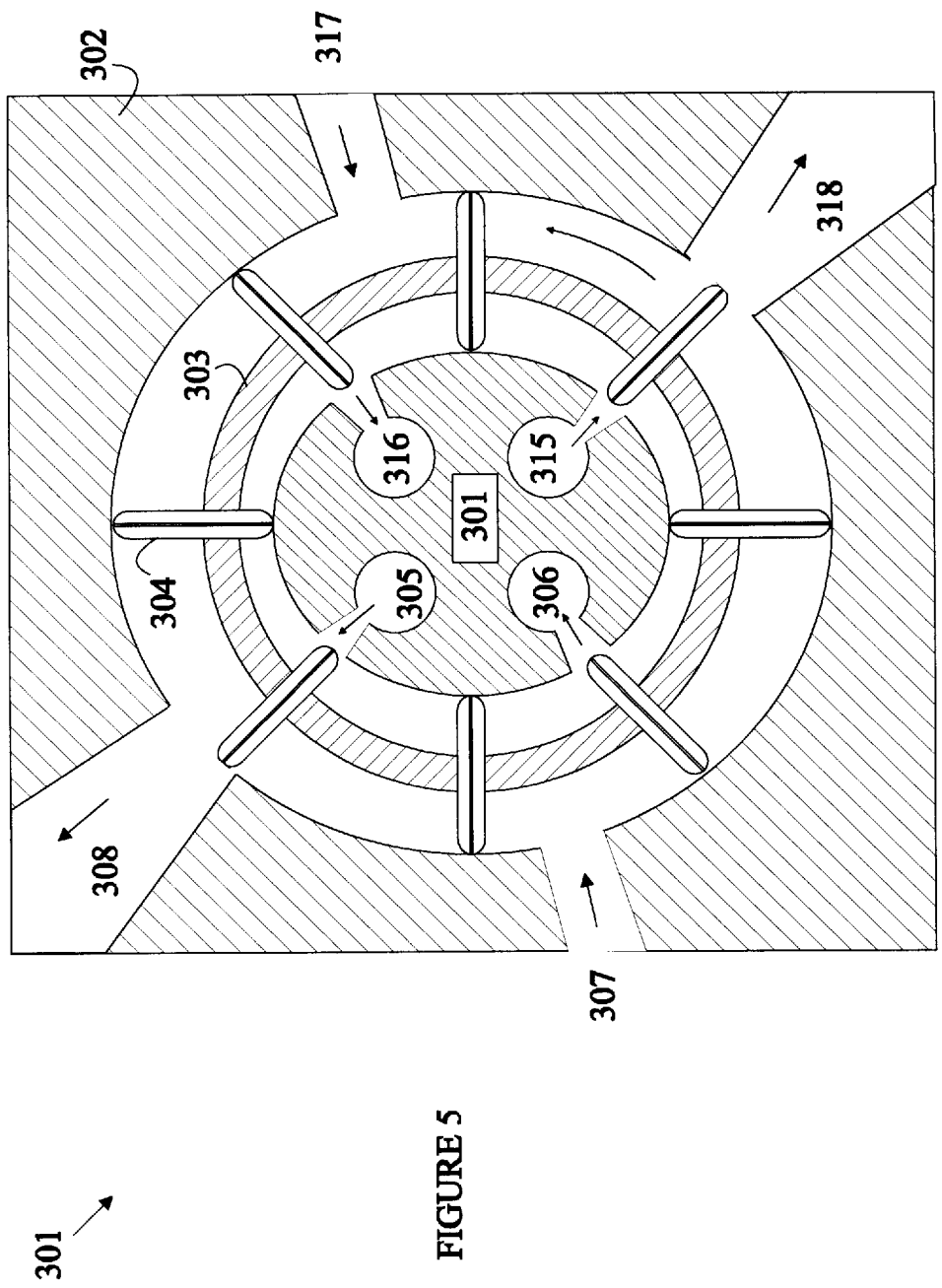
FIG. 5 is a cross-sectional view of the preferred embodiment of an expander as utilized by the heat recovery system of the preferred embodiment of the present invention.

The expansion engine can be constructed from a classical steam engine; however, the preferred embodiment of expansion engine 243 utilizes a novel two stage expander which is disclosed in detail in co-pending U.S. patent application Ser. No. 08/583,419 filed on Jan. 5, 1996 entitled "An Improved Two Stage Rotating Vane Device Suitable for Operation as a pump, Compressor, Expander, Gas Turbine Engine, Refrigerator, Air Conditioner or Turbo Supercharger" which is hereby incorporated by reference. A cross-sectional view of such an expander is shown in FIG. 5 at 300. Expander 300 has an inner stator 301 and an outer stator 302. The stator surfaces are elliptical in shape and aligned such that the separation of the surfaces is constant.

A circularity cylindrical rotor 303 rotates between stators 301 and 302. Rotor 303 is propelled by the pressure of the expanding material against a plurality of vanes of which vane 304 is typical. The vanes are free to move in a radial direction with respect to rotor 303.

The expanding material is introduced through ports in the stators. Each stator has two sets of symmetric ports. Each set of ports consists of a first port that applies the expanding fluid against the vanes and a second port through which the expanded fluid exits. Fluid is applied to the portion of the vanes on the inner surface of rotor 303 30 through ports 305 and 315 in stator 301. This fluid exits via ports 306 and 316, respectively. Similarly, fluid is applied to the portion of the vanes on the outer surface of rotor 303 through ports 307 and 317 in stator 302. This fluid exits via ports 308 and 318, respectively.

Expander 300 may be operated in either a series or parallel mode depending on the connections between the ports of inner stator 301 and outer stator 302. When operated in series, the fluid leaving inner stator 301 via ports 305 and 315 is used as the input to ports 307 and 317, respectively. The connection is made via piping which is not shown in the drawing, as it is out of the plane through which the cross-section has been taken. When operated in this mode, the geometry of the stators must be chosen such that both the inner and outer stages are designed for the same mass flow.

Figure 6:
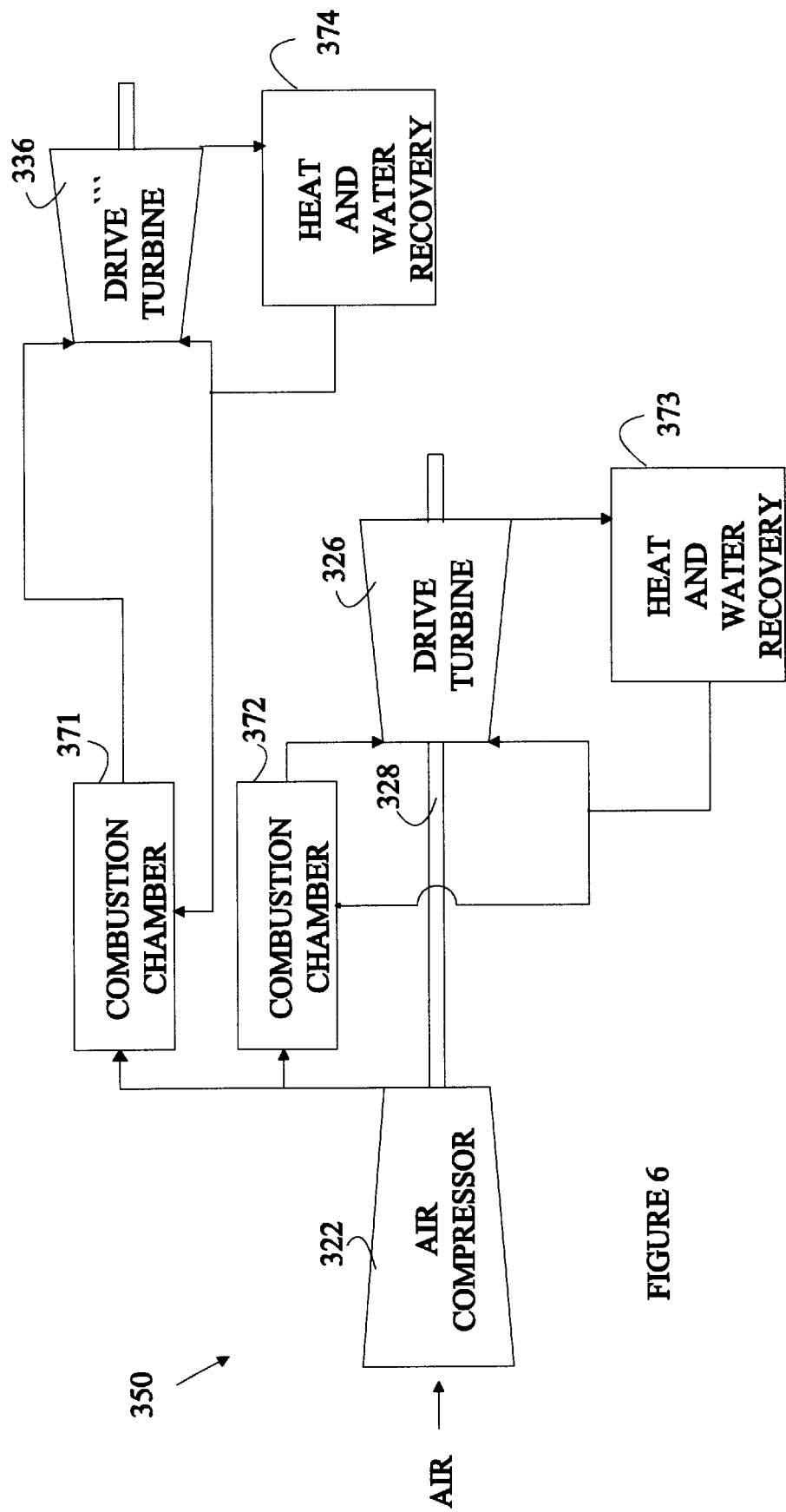
FIG. 6 is a block diagram of an embodiment of the present invention utilizing separate combustion chambers for the two turbines.

The above described embodiments of the present invention utilized a valve in the output of the secondary turbine system or variable inlet area nozzles to control the mass flow through the secondary turbines. An alternative arrangement which eliminates the need for such a high temperature valve is shown in FIG. 6 at 350. Engine 350 utilizes two combustion chambers shown at 371 and 372, respectively. Both chambers receive compressed air from air compressor 322 which is driven by drive turbine 326 via shaft 328. The secondary drive turbine 336 is driven from combustion chamber 371. The mass flow through drive turbine 336 is controlled by the rate of combustion in chamber 371. The heat recovery system utilized in engine 350 has been split into two heat recovery systems shown at 373 and 374, respectively. This arrangement allows engine 336 to be shut down without altering the operation of engine 326.

Various modifications to the present invention will become apparent to those skilled in the art from the foregoing description and accompanying drawings. Accordingly, the present invention is to be limited solely by the scope of the following claims.

What is claimed is:

1. A gas turbine engine comprising:
    an air compressor;
    a combustion chamber connected to said air compressor for burning fuel with air from said air compressor, said combustion chamber including means for receiving water and combining said water with gases generated by the burning of said fuel to generate a gaseous output;
    first and second turbines driven in parallel by said gaseous output of said combustion chamber, said first turbine accommodating a maximum mass flow that is greater than or equal to the maximum gaseous output of said combustion chamber in the absence of said water and less than the maximum mass output of said combustion chamber in the presence of said water; and
    means for recovering heat from said gaseous output after said gaseous output has passed through said turbines.

2. The engine of claim 1 wherein said means for recovering heat further comprises means for recovering water from said gaseous output.

3. The engine of claim 1 wherein said means for recovering heat comprises a supercritical heat exchanger.

4. The engine of claim 1 wherein said means for recovering heat comprises an expander.

5. A gas turbine engine comprising:
    an air compressor;
    a combustion chamber connected to said air compressor for burning fuel with air from said air compressor, said combustion chamber including means for receiving water and combining said water with gases generated by the burning of said fuel to generate a gaseous output;

first and second turbines driven in parallel by said gaseous output of said combustion chamber;

means for recovering heat from said gaseous output after said gaseous output has passed through said turbines; and means for regulating the fraction of said gaseous output that passes through said second turbine.

6. The engine of claim 5 wherein said regulating means comprises a valve that restricts the flow of gases leaving said second turbine.

7. The engine of claim 5 wherein said regulating means comprises adjustable area nozzles.

8. A gas turbine engine comprising:

an air compressors;

a combustion chamber connected to said air compressor for burning fuel with air from said air compressor, said combustion chamber including means for receiving water and combining said water with gases generated by the burning of said fuel to generate a gaseous output;

first and second turbines driven in parallel by said gaseous output of said combustion chamber; and means for recovering heat from said gaseous output after said gaseous output has passed through said turbines, wherein a portion of said recovered water is introduced directly into said first and second turbines to cool said engines.

* * * * *